United States Patent [19]

Campo

[11] Patent Number: 4,953,457
[45] Date of Patent: Sep. 4, 1990

[54] METHOD AND A CONTINUOUS CYCLE COMPACTOR-APPARATUS, INCLUDING A CIRCULATING FORCED AIR PRE-CHAMBER FOR TREATING BIODEGRADABLE SOLID URBAN WASTE MATERIALS AND FOR SEPARATING AND RECYCLING THE NON-BIODEGRADABLE COMPONENTS THEREOF

[76] Inventor: Liborio Campo, Via Monte Grappa 58, 91011 Alcamo, Italy

[21] Appl. No.: 323,331

[22] Filed: Mar. 14, 1989

[30] Foreign Application Priority Data

Mar. 14, 1988 [IT] Italy ............................... 86201 A/88

[51] Int. Cl.$^5$ ........................ B30B 9/02; B30B 9/00; B30B 9/06
[52] U.S. Cl. ........................................ 100/37; 100/35; 100/39; 100/41; 100/73; 100/90; 100/95; 100/127; 100/246; 100/295
[58] Field of Search ................. 100/35, 37, 39, 41, 100/71-75, 90, 91, 94, 95, 127, 179, 215, 218, 240, 245-247, 249, 250, 295, 192, 254

[56] References Cited

U.S. PATENT DOCUMENTS

| | | | |
|---|---|---|---|
| 3,355,260 | 11/1967 | Bruniche-Olsen | 100/75 X |
| 3,604,179 | 9/1971 | Lund | 100/39 X |
| 3,607,391 | 9/1971 | Shann | 100/74 X |
| 4,646,633 | 3/1987 | Falguieres | 100/127 X |

FOREIGN PATENT DOCUMENTS

| | | | |
|---|---|---|---|
| 2356029 | 5/1975 | Fed. Rep. of Germany | 100/249 |
| 715033 | 11/1931 | France | 100/127 |
| 1323314 | 2/1963 | France | 100/95 |
| 2155764 | 5/1973 | France | 100/35 |

Primary Examiner—Harvey C. Hornsby
Assistant Examiner—Stephen F. Gerrity
Attorney, Agent, or Firm—Young & Thompson

[57] ABSTRACT

A method and apparatus for treating biodegradable solid urban waste materials and selecting those non biodegradable components for recycling comprises a tunnel (1) made of steel defining an inner room or ambient of parallelepiped shape, having a rear hinge door (4) associated with adjustable counterbalance weight (5). Near the door (4) blade kneading devices (6) can be installed. In the last portion of the bottom wall of the tunnel (1) holes (7) are arranged, positioned just over a channel (3) connected to a recovering tank (22) of the percolate. At the other front end of the tunnel a moving wall (9) is mounted, capable of being moved to and fro along two rails (10) by means of hydraulic jacks (12). In the center of the wall (9) a hydraulic cylinder (31, 31a, 31b) is anchored, the piston rod (31a) which enters into the iner chamber of the tunnel (1) for compressing the waste mass. Near the upper wall (32) of the tunnel (1), there is a circulating forced air pre-chamber (13) having a grating structure. Parallel to the pre-chamber (13), there are two perforated pipes (33, 33a) into which are periodically conveyed percolation liquids. In the upper wall (32) at least one opening (20), closed by a cover, is arranged for charging waste materials to be treated. On the same wall (32), there are also installed discharge vertical pipes (18) for the discharge of biogases, communicating with the pre-chamber (13).

3 Claims, 2 Drawing Sheets

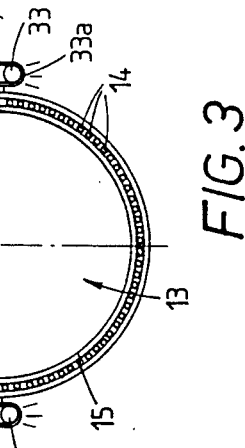
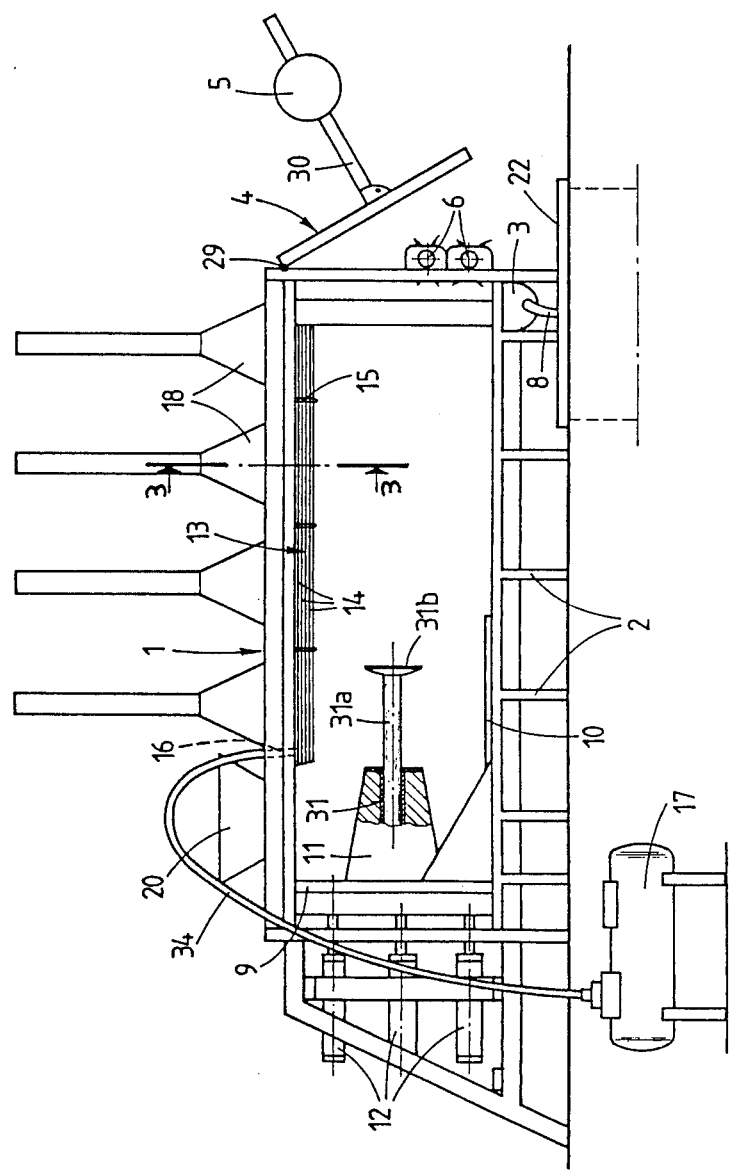

METHOD AND A CONTINUOUS CYCLE COMPACTOR-APPARATUS, INCLUDING A CIRCULATING FORCED AIR PRE-CHAMBER FOR TREATING BIODEGRADABLE SOLID URBAN WASTE MATERIALS AND FOR SEPARATING AND RECYCLING THE NON-BIODEGRADABLE COMPONENTS THEREOF

BACKGROUND OF THE INVENTION

1. Field of the Invention

The present invention relates to a method and apparatus including a compactor-tunnel, made of steel and designed to receive solid urban waste materials into a substantially closed, but ventilated ambient or room, thus permitting to eliminate said waste materials according to a natural system and according to a substantially continuous cycle, and, at the same time, permitting the recovery and re-cycle of and non-biodegradable waste material.

2. Description of the Prior Art

To date, as far as the problems of the elimination of solid urban waste materials are concerned, apparatus and methods are known, which are only capable of separating solid biodegradable waste materials from non-biodegradable ones, wherein the former are picked, while the biodegradable waste materials are utilized as fertilizers, instead of letting them lay in discharge areas.

SUMMARY OF THE INVENTION

The present invention, on the contrary, provides to for conveying said solid urban waste materials into a substantially closed, but ventilated ambient or room and to compress the mass to a predetermined limit degree so as to separate therefrom the percolate and to discharge the biogases obtained in the process into the atmosphere, after having suitably filtered said biogases by means of known filtering systems adapted to eliminate the bad scents, while the purified biogases are recovered and utilized to produce energy.

According to the present invention, the apparatus comprises a compacting tunnel, made with steel elements, having the dimensions of about 100 m×6 m×6 m and of a parallelepiped shape of a rectangular cross section, and defining an inner treatment ambient or room, of a variable volume. Just underneath of the upper wall of the tunnel a prechamber is arranged, defined by a semicylindrical grating wall which extends for a length less than that of the tunnel. Said pre-chamber wall is composed of longitudinal steel bars, spaced apart from each other by about 5 mm and connected at their ends to semi-rings, while other support semi-rings are arranged at a distance of about 1 m from each other.

One of the two ends of the tunnel, which have areas smaller than those of the other longitudinal walls of the tunnel, is closed by a movable door, pivotally hinged to the transverse edge of the upper wall of the tunnel. To the outer surface of said door a central arm is attached, on which arm a blance weight is mounted in adjustble position, said balance weight being adapted to maintain said door in a sealed closed condition until a pressure of a predetermined value is created on the opposite surface of said door.

Into said tunnel, near said movable door, kneading devices can be mounted during the discharge step of the waste material treating cycle, while, in the bottom wall, near the movable door, said bottom wall is provided with a plurality of through holes, through which liquids, coming out from the treated waste mass, can percolate and be collected into a channel, mounted underneath, said channel communicating with a collecting tank of said percolate; a part of which latter can be recycled to the inside of the tunnel.

At the other opposite end of the tunnel this latter is closed by a movable wall, which can be moved to and fro over a predetermined range in the direction of the length of said tunnel.

At least one charge opening is provided in the upper wall of the tunnel for the feeding of the waste materials into the inner room, said opening being closed by a removable cover, while substantially vertical pipes for the discharge of the bio-gases are mounted on the upper wall of the tunnel, just above the pre-chamber, said pipes including filtering devices and ending at thier lower ends into said pre-chamber.

Parallel to the extension direction of the pre-chamber and near its longitudinal edges some perforated pipes are mounted spaced apart from one another, into which pipes will be periodically conveyed the percolate fed from the outside percolate tank. Inside of the pre-chamber, and through an orifice arranged in the upper wall of the tunnel, compressed air will be fed, produced by an adjacent compressor. The purpose of the invention is to contain waste urban solid materials in closed but ventilating ambient and also to re-cycle all the biogases.

This is possible by closing the appropriate discharge orifices which, in other condition, serve only for the elimination of waste materials in an aerobic way. The advantage obtained through this method essentially consists in the partial elimination of the biodegradable materials in an aerobic way, thus avoiding any methane gas formation, thanks to the circulating forced air inside of the pre-chamber and also owing to the presence of those waste materials which are not biodegradable, particularly plastic materials, which considerably increase the support surface of the biodegradable materials and remarkably accelerate the decomposition process. That is facilitated also by the utilization of the percolate, obtained from the compression step, in order to moisten the mass, as well as thanks to the air circulation inside of the tunnel. In such a manner these waste materials can be eliminated in an aerobic way, leaving inside of the tunnel only a little part of those which are biodegradable waste materials, to be used as fertilizer. The non-organic material will be thus considerably concentrated and that makes it more simple to use a mechanized selection in order to re-cycle the non-biodegradable material. This operation will facilitate the recovery of plastics, to be sent to industries for the re-cycling thereof, and will solve the pollution problems, and facilitate the recovering of glass, piles, batteries, iron, etc..

BRIEF DESCRIPTION OF THE DRAWINGS

The invention will be more easily understood by reference to the following detailed description and the accompanying drawings, in which:

FIG. 2 is a side view of the apparatus from which the longitudinal frontal wall has been removed; and FIG. 3 shows, on an enlarged scale, the cross section of the pre-chamber, taken on line 3—3 of FIG. 2.

DETAILED DISCUSSION

Figure 1:
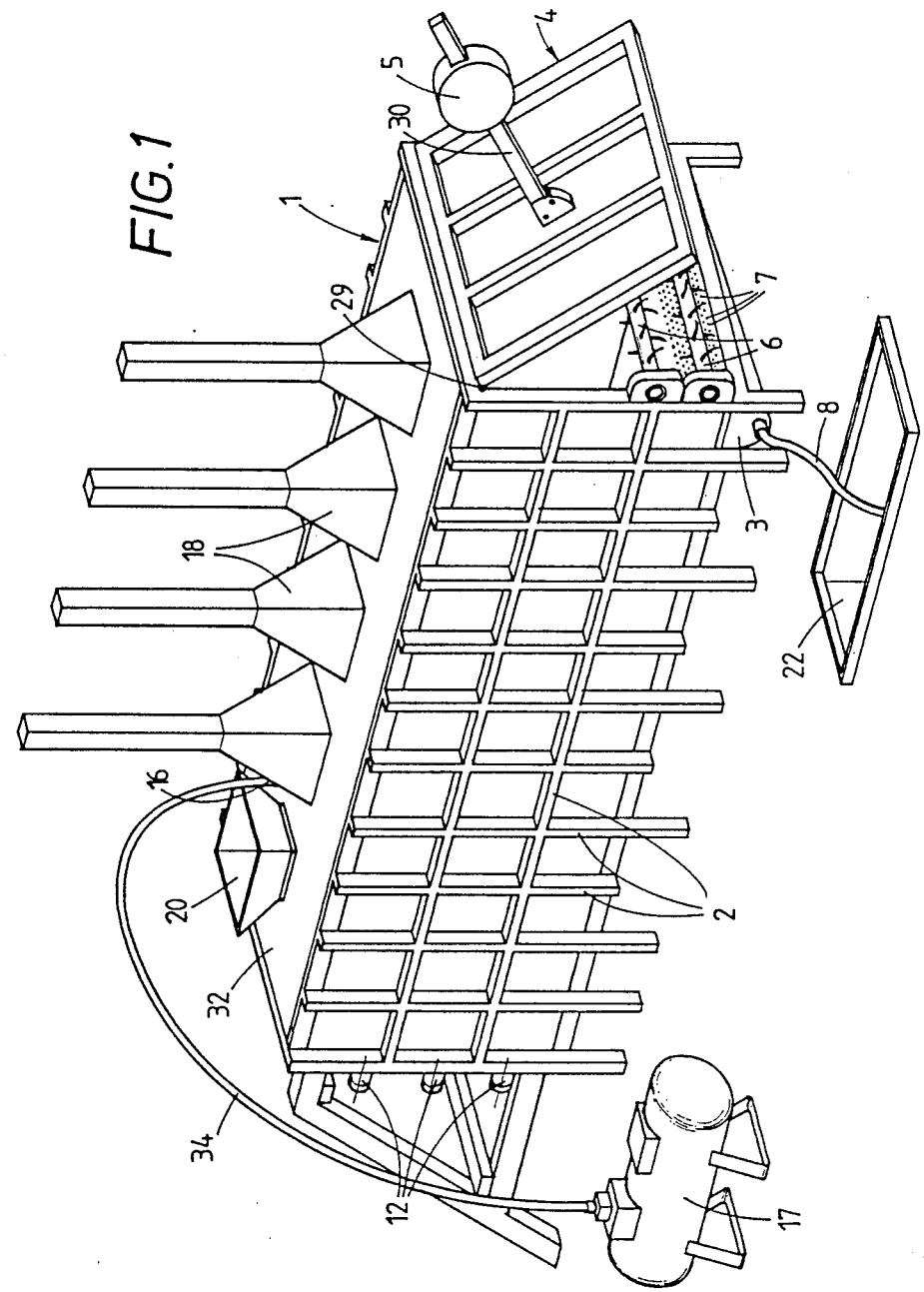
FIG. 1 shows a perspective view of the apparatus, seen from the outside.

The drawings represent a continuous cycle compactor-tunnel 1, for receiving urban solid waste materials. The tunnel 1 has a parallelepiped form, with a rectangular cross section, whose variable dimension is preferably of 100 m×6 m×6 m. It is made in steel sheets with an outer support framework 2 consisting in some beams (see FIG. 1) so that the internal pressure cannot deform the tunnel walls. On one of the two parallel end faces, having a smaller surface, a movable door 4 is pivotally hinged at 29 to the rear transverse edge of the upper wall 32 of the tunnel 1. Said door 4 is made integral with an outer arm 30, on which one or more counterbalances 5 are adjustable mounted, so as to maintain the door 4 sealingly closed as long as the inner pressure, to which the waste material is subjected, is does not overcome the counterbalance resistance, thus permitting the door 4 to automatically open. It is to be noted that the counterbalance resistance can be overcome, only when the tunnel has no more capability to contain other waste materials. On the other end of the tunnel, it is closed by a moving wall 9.

Once the automatic opening door 4 is opened, there will be installed two blade kneading devices 6, capable of mechanically separating the components of the solid waste mass while the percolation liquids come out from throughholes 7 arranged in the tunnel bottom wall, provided at the rear part thereof, just above a collecting channel 3, connected by the hose 8 with the outside percolate tank 22. Opposite to the rear side, there is the moving wall 9 having a particular structure and which can be caused to slide along two rails 10. At the centre of said wall 9 is mounted a hydraulic piston cylinder 31 (FIG. 2) inserted through the moving wall 9 and a frustoconical body 11 the piston rod 31a of which, having a pressure head 31b at the end of the forward stroke, extends, thus creating a pressure on the waste mass in the middle of the tunnel. This is done for the purpose of creating different compression on the mass inside of the tunnel, thus promoting the mixing of said mass. The advancing of the moving wall 9 is obtained by hydraulic jacks 12, anchored at the external framework of the tunnel. In the inside of the tunnel a pre-chamber 13 is provided underneath the upper wall 32, for the circulation of forced air therein. The wall of the pre-chamber 13 has a grating structure in the form of a semicylinder having a length substantially equal to the minimum length of the inner treating chamber. Said wall of the pre-chamber 13 consists of a plurality of bars 14, spaced from one another by about 5 mm; the bars 14 being connected to each other by means of metal semi-rings 15 mounted at the ends of the plurality of bars 14 and on intermediate points thereof.

Underneath the ceiling surface of the tunnel, and parallel to the bars 14 of the pre-chamber 13, there are some perforated pipes 33, spaced apart from each other, into which percolate will periodically be fed, conveyed from the outside tank 22.

The percolate, coming out from the pipe holes 33a, moistens the waste mass and promotes the decomposition process of the organic material, also eliminating a part of it in an aerobic way to free the percolate itself. Inside of the pre-chamber 13, compressed air is fed through the entrance 16, and supplied by a pipe 34 by a compressor orifice 17. From the upper wall 32 of the tunnel discharge pipes 18 extend upwards, spaced apart from each other by about 20 m and which serve to discharge the air conveyed into the tunnel. Said pipes or stacks 18 have a height of about 20 m and have some special siphon filters mounted therein, well known in the art, for reducing the bad scents from the discharges.

Through the upper wall 32, at least one opening 20, closed by a cover (not shown in the drawings) is provided to help the total filling up of the tunnel.

Therefore, by causing the forward stroke of the moving wall 9, the waste materials can be compressed. As soon as the tunnel is filled up, the moving door 4 opens so that two suitable blade kneading devices 6 can be installed to facilitate a mechanized selection of the treated waste materials, consisting in residual parts of biodegradable materials and all the non-biodegradable ones inside of the tunnel. The tunnel bottom is spaced apart from the soil on its forward slope end by about 2 m and on its rear end by about 1 m.

I claim:

1. A method for treating biodegradable solid urban waste materials and for separating and recycle of non-degradable waste materials, comprising:
   feeding said waste materials into a substantially closed but ventilated tubular room, of a variable volume, into which compressed air is conveyed;
   compressing said waste material in said room to a predetermined degree;
   removing biogas produced therein through a plurality of pipes, and passing and filtering said gas through hydraulic siphon filters;
   removing percolate obtained in the compression step, and partially recycling the percolate into the treatment room, for moistening the compressed mass; and
   discharging solid non-biodegradable material using kneading means for the treated compressed waste material mass.

2. An apparatus for treating biodegradable solid urban waste materials, comprising a tunnel (1) made of steel, defining an inner tubular room or ambient, substantially closed but adapted to contain compressed air for ventilation of waste material enclosed in said treatment room, said tunnel extending longitudinally and having front and rear ends, the rear end comprising a pivotally hinged door (4) having an arm (30) extending rearwards longitudinally from said door (4) and at least one counterbalance (5) adjustably mounted on said arm (30), the front end of said tunnel (1) comprising a longitudinally displaceable wall (9) and a pair of rails (10) on which slides the displaceable wall (9); wherein adjacent the hinged door (4) the tunnel comprises a plurality of through-holes (7) positioned just above a channel (3), mounted underneath thereof, said apparatus further comprising a hose (8) connecting the channel (3) to a tank (22) designed to collect the percolation liquids; wherein the tunnel (1) comprises an upper wall (32) having a pre-chamber (13) depending therefrom and comprising a semicylindrical grating wall (14, 15), having a length less than that of the tubular room, a plurality of vertical pipes (18) passing through the upper wall (32), underneath of which the pre-chamber (13) is disposed, said pipes (18) comprising siphon filtering devices; perforated longitudinal pipes (33) adjacent the grating wall (14, 15) of the pre-chamber (13), said pipes (33) being connected to the tank (22) so as to supply into the tunnel percolation liquids, in order to moisten the waste materials being treated; further comprising at least one loading opening (20) in the upper wall (32) of the tunnel (1), downstream of the movable wall (9), and having a removable cover; the displaceable wall (9) comprising a hydraulic piston cylinder (31) axially extending from a conical body (11) integrated with the wall (9) and a plurality of a hydraulic jacks (12) adapted to displace said wall (9) along said rails (10), while the hydraulic cylinder (31) is adapted to extend its piston rod (31a) into the treatment room, after the displaceable wall (9) has reached its forward limit, so as to compress the waste material; and wherein said tunnel (1) comprises a pipe (34) entering therein into the pre-chamber (13), said pipe being connected with a compressed air source (17), so as to feed into said pre-chamber (13) compressed air that thereafter enters into the tubular room passing through the grating wall (14, 15) of said pre-chamber.

3. Apparatus according to claim 2, wherein the pre-chamber (13) comprises a plurality of longitudinal bars (14) and a plurality of semi-rings (15) interconnecting said bars, said bars (14) being spaced apart from each other by about 5 mm.

* * * * *